US012250516B2

(12) United States Patent
Gordeyev et al.

(10) Patent No.: US 12,250,516 B2
(45) Date of Patent: Mar. 11, 2025

(54) STRUCTURES AND METHODS OF MANUFACTURE FOR 3D AUDIO METAMATERIALS

(71) Applicant: 1964 Ears, LLC, Vancouver, WA (US)

(72) Inventors: Vitaliy Gordeyev, Oregon City, OR (US); Eric Zaytsev, Vancouver, WA (US)

(73) Assignee: 1964 Ears, LLC, Vancouver, WA (US)

( * ) Notice: Subject to any disclaimer, the term of this patent is extended or adjusted under 35 U.S.C. 154(b) by 142 days.

(21) Appl. No.: 17/900,594

(22) Filed: Aug. 31, 2022

(65) Prior Publication Data

US 2024/0073590 A1 Feb. 29, 2024

(51) Int. Cl.
*H04R 1/28* (2006.01)
*H04R 1/10* (2006.01)

(52) U.S. Cl.
CPC ........... *H04R 1/288* (2013.01); *H04R 1/1016* (2013.01); *H04R 1/1075* (2013.01); *H04R 1/2811* (2013.01)

(58) Field of Classification Search
CPC .... H04R 1/288; H04R 1/2811; H04R 1/1016; H04R 1/1075; G10K 11/162; G10K 11/168; G10K 11/172; G10K 11/002; G10K 2210/3223; G10K 2210/3224
USPC ............... 181/286, 207, 292, 288, 222, 252; 381/380, 370, 374, 372, 322, 382, 338, 381/345, 354, 337
See application file for complete search history.

(56) References Cited

U.S. PATENT DOCUMENTS

| | | | | |
|---|---|---|---|---|
| 2012/0051574 A1* | 3/2012 | Lin | H04R 1/2803 | 381/353 |
| 2014/0339014 A1* | 11/2014 | Varanasi | G10K 11/168 | 181/292 |
| 2015/0156583 A1* | 6/2015 | Mulumudi | G10K 11/26 | 381/67 |
| 2015/0267653 A1* | 9/2015 | Kinsey, Jr. | F02M 35/02416 | 123/198 E |
| 2020/0193952 A1* | 6/2020 | Moon | B32B 7/02 | |
| 2021/0280161 A1* | 9/2021 | Lee | G10K 11/168 | |

* cited by examiner

*Primary Examiner* — Norman Yu
(74) *Attorney, Agent, or Firm* — Elliott, Ostrander & Preston, P.C.

(57) ABSTRACT

Engineered, pseudo-crystalline materials are formed of repeating arrays or lattices of similar basic elements. The materials are porous, so that a gas such as air can pass through the material. Audio waves propagating through the gas can also pass through the material, and these waves experience a passive, uneven, frequency-dependent modification as a result of passing through the material. The frequency response of this modification can be tuned by selecting the shape, size, and repetition patterns of the basic elements in the lattice, as well as the ingredients from which the pseudo-crystalline materials are made.

20 Claims, 10 Drawing Sheets

STRUCTURES AND METHODS OF MANUFACTURE FOR 3D AUDIO METAMATERIALS

FIELD

The invention relates to engineered materials for modifying sound. More specifically, the invention relates to materials having a semi-periodic structure, which permit sound waves in a gaseous medium to pass therethrough, with passive amplitude modulation correlated to audio frequency.

BACKGROUND

Crystalline materials are found in nature, and may also be manufactured by subjecting certain elements or compounds to suitable conditions to encourage crystals to form. Under proper conditions, crystals self-assemble, with atoms or molecules arranging themselves into a repeating, periodic lattice-like structure. Elements and compounds in crystalline form often exhibit useful properties. For example, silicon atoms in a crystal have electrical properties that can be manipulated with impurity-doping or other techniques to behave as semiconductors.

Some materials can be manipulated to arrange themselves into a variety of different lattice structures, which may have wildly different properties. For example, carbon atoms can be arranged in a lattice of tetrahedrical volumes (with a carbon atom at each vertex of the tetrahedron); this structure, commonly called "diamond," is an electrical insulator that is also exceedingly hard (scratch-resistant). On the other hand, carbon atoms can also be arranged in sheets of hexagonally-connected rings, a structure known as "graphene." Graphene is flexible and supple, an excellent electrical and thermal conductor, and is remarkably strong for its weight and dimensions.

Contemporary engineering techniques do not yet permit the assembly of arbitrary atoms and molecules into periodic crystal lattices—only those materials which have an energetically-favorable arrangement that can be accessed via bulk conditions (such as temperature, concentration, electrical or magnetic field, etc.) But crystal-like periodic lattices of small (but not atomic-scale) structures can be manufactured, and these materials often exhibit useful properties as well.

SUMMARY

Three-dimensional metamaterials are constructed as pseudo-crystalline lattices of cellular units repeating in two or three non-parallel directions, such that the lattice is porous and permits gas to pass therethrough, and audio waves propagating through the gas experience an uneven, frequency-dependent modification that varies with the shape, composition and lattice structure of the metamaterial.

DETAILED DESCRIPTION

Embodiments of the invention are bulk materials made of repeating copies of one or more basic units or "cells," where one or more structures repeat periodically throughout the bulk material. The materials are all characterized in that they are porous—a gaseous substance (e.g., air) can pass through the material in at least one direction when a pressure gradient causes it to do so. Further, the materials are characterized in that they exhibit a varying modification of audio waves propagating through a gaseous medium suffusing the material. The modification is not uniform: a plot of frequency vs. transmission will exhibit peaks or valleys different from the frequency plot seen in sound waves passing through an empty volume of the same shape as the outer boundaries of a sample of the bulk material. The material may function as a low-pass filter, a high-pass filter, a bandpass filter, or may attenuate the sound waves in a more complex (though still passive) manner. Some frequencies may even be boosted over the free-air response.

Figure 1:
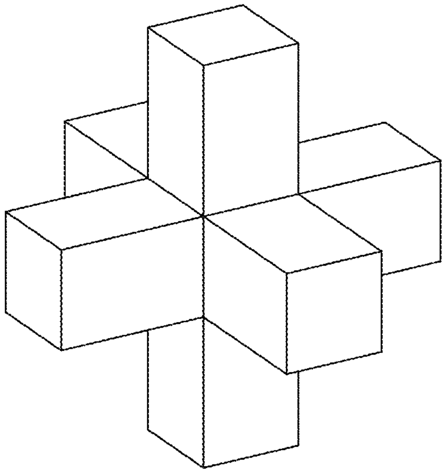
FIG. 1 shows a simple three-dimensional "plus" object.

FIG. 1 shows a simple, three-dimensional "plus" sign, which may form a basic element of a bulk material according to an embodiment of the invention. An embodiment may use basic elements scaled to any size, but preferred sizes (for the cubic volume surrounding an element such as the one depicted here) are in the range of about $1\times10^{-6}$ ml (0.1 mm×0.1 mm×0.1 mm) to about 1 ml (1 cm×1 cm×1 cm).

Figure 2:
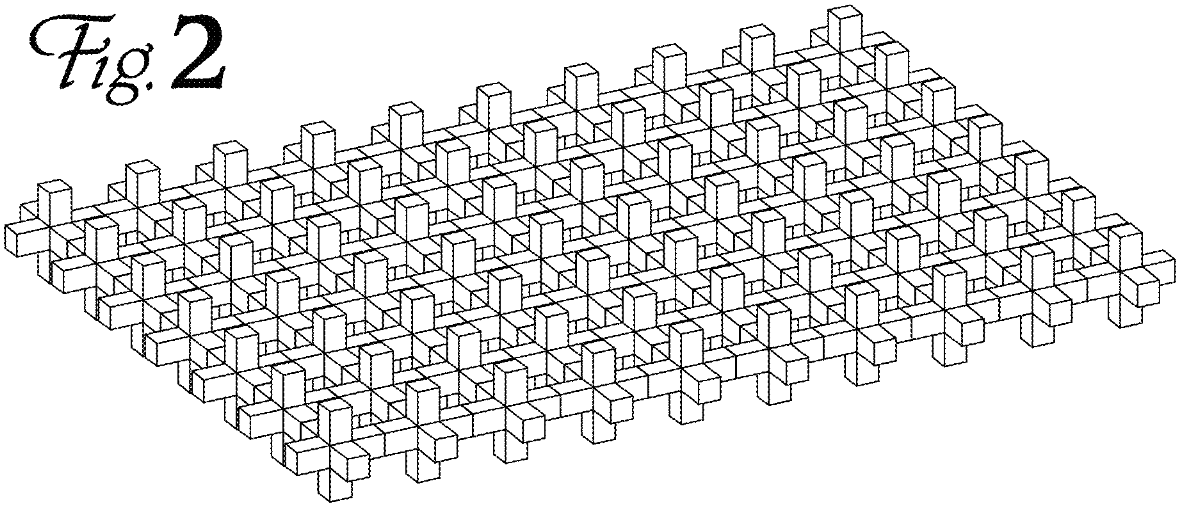
FIG. 2 shows how a number of copies of the three-dimensional "plus" object can be arranged to form a flat, repeating, periodic structure.

A basic material according to an embodiment may comprise a two-dimensional array of copies of the basic element, as shown in FIG. 2. Although copies are only made along two directions, the material itself is three-dimensional because the basic element has a thickness as well as a width and a length.

Figure 3:
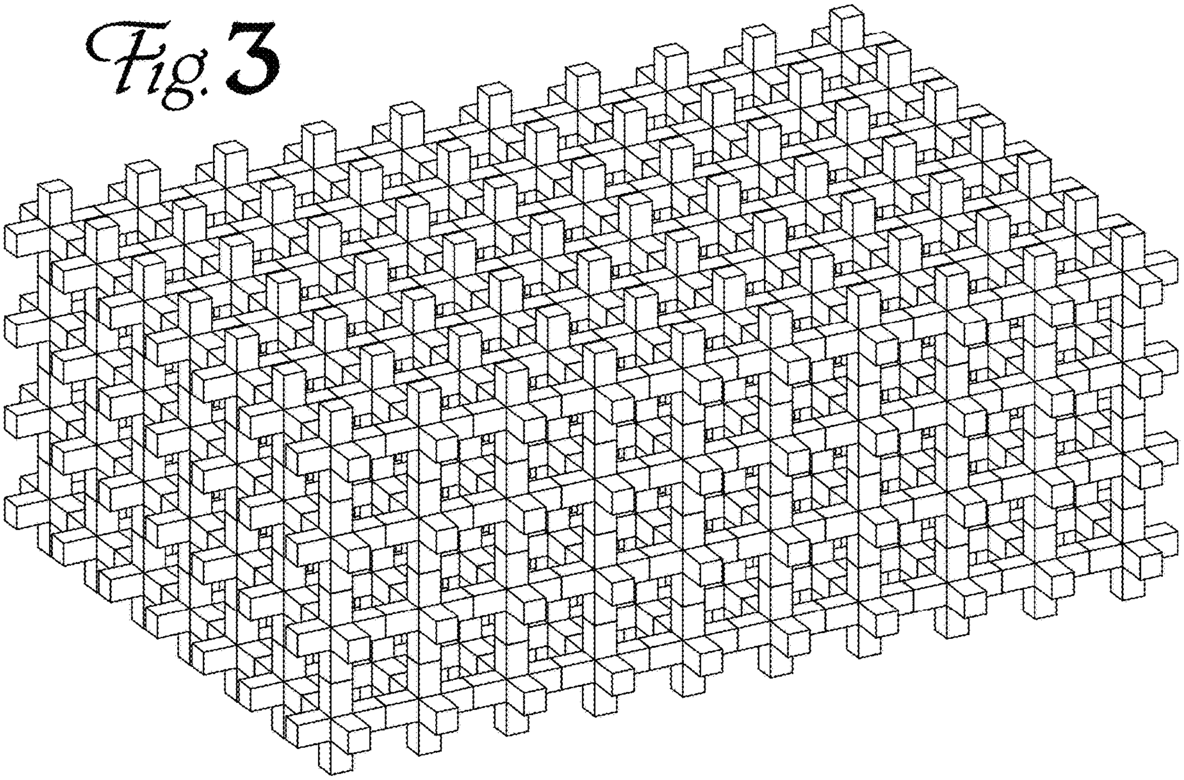
FIG. 3 shows how the three-dimensional "plus" object can be arranged by repeating in three dimensions to construct a pseudo-crystalline material.
Figure 4:
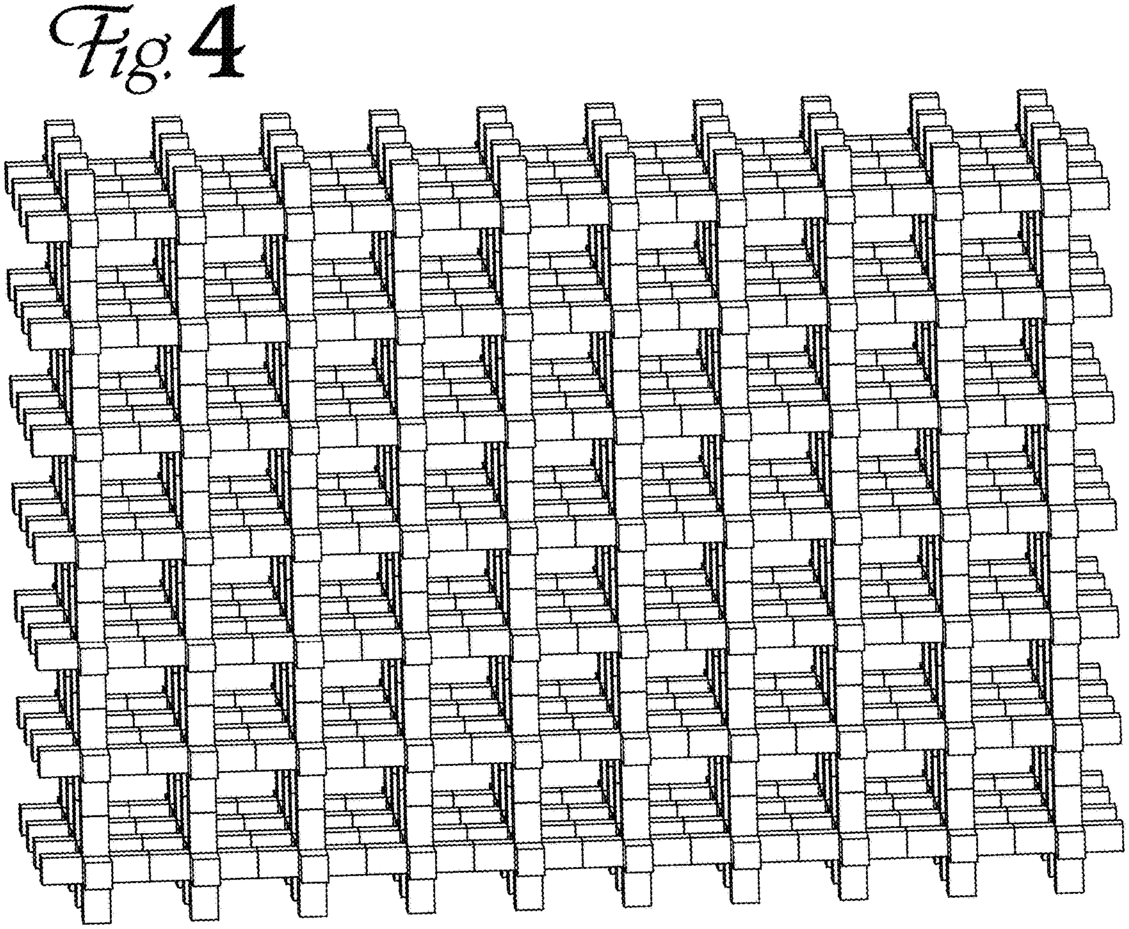
FIG. 4 shows the pseudo-crystalline material from a different vantage point to illustrate how the material has many open passages through the lattice.

FIG. 3 shows a basic material made by repeating copies of the basic element in three dimensions. Since the basic element is a symmetric object that fits in a cubic volume, this material has uniform periodicity in each of the three directions of repetition. Further, in this embodiment, the directions of repetition are mutually orthogonal. From some viewpoints, at least some straight lines through the material are interrupted by portions of one or more basic elements. However, by shifting the viewpoint slightly (as shown in FIG. 4), one can see that the material overall is porous: some straight lines can pass through the material uninterrupted, and a gaseous substance could also pass through the material (with resistance proportional to the size of the open channels).

It is appreciated that, for very small basic elements, or basic elements that occupy a large proportion of each basic volume, it is possible that the openings through the material would be too small for molecules of gas to pass, and so the material would be effectively non-porous (at least as to gas molecules of that size or larger). Non-porous materials are not contemplated as useful embodiments of the invention.

The basic elements, and by extension the material of an embodiment, may be formed of a material such as a metal or polymer that can be selectively hardened, for example by laser sintering of a powder or ultraviolet curing of a light-sensitive liquid. These manufacturing techniques permit the layer-by-layer construction of repeating, pseudo-crystalline structures like those described here. Alternatively, materials may be constructed by depositing small volumes ("voxels") of the material in a viscous liquid or plastic state (e.g., as a heated polymer) so that the volumes fuse together when they cool. These techniques are generally known as "3-D printing."

Figure 5:
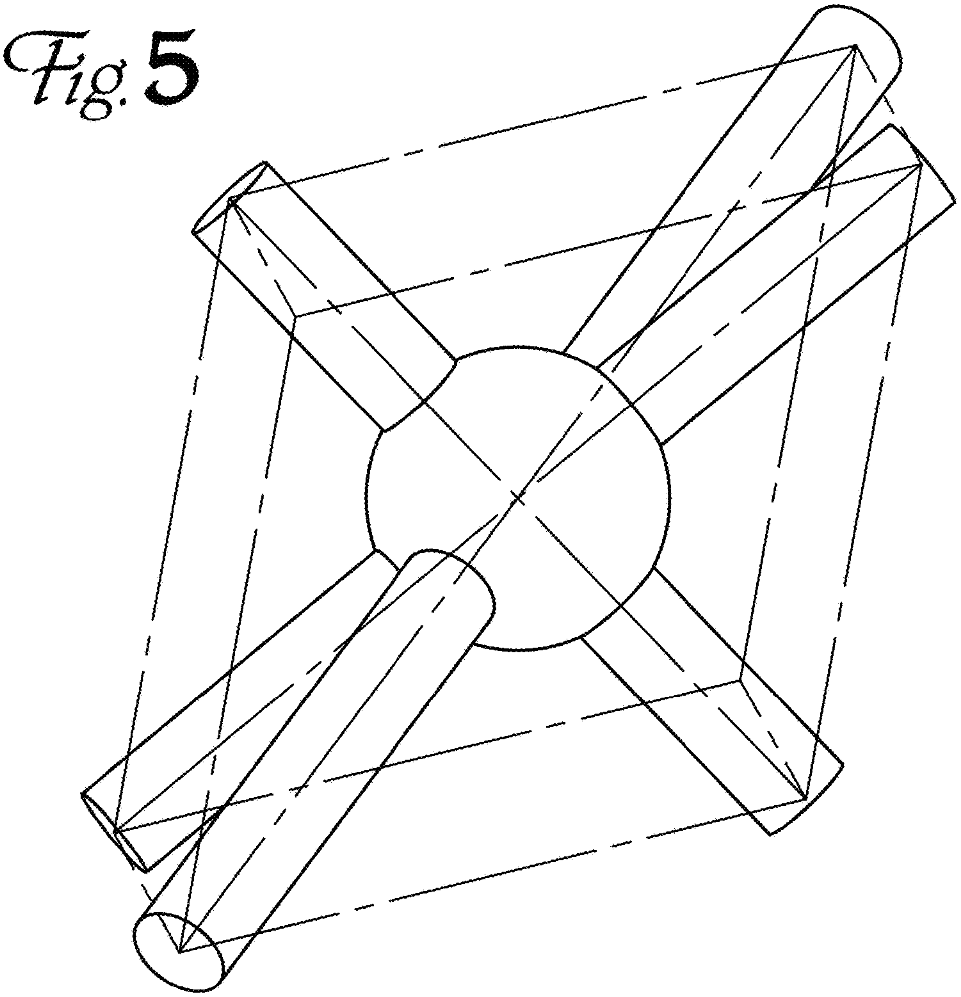
FIG. 5 shows another simple object that occupies a trapezoidal volume.
Figure 6:
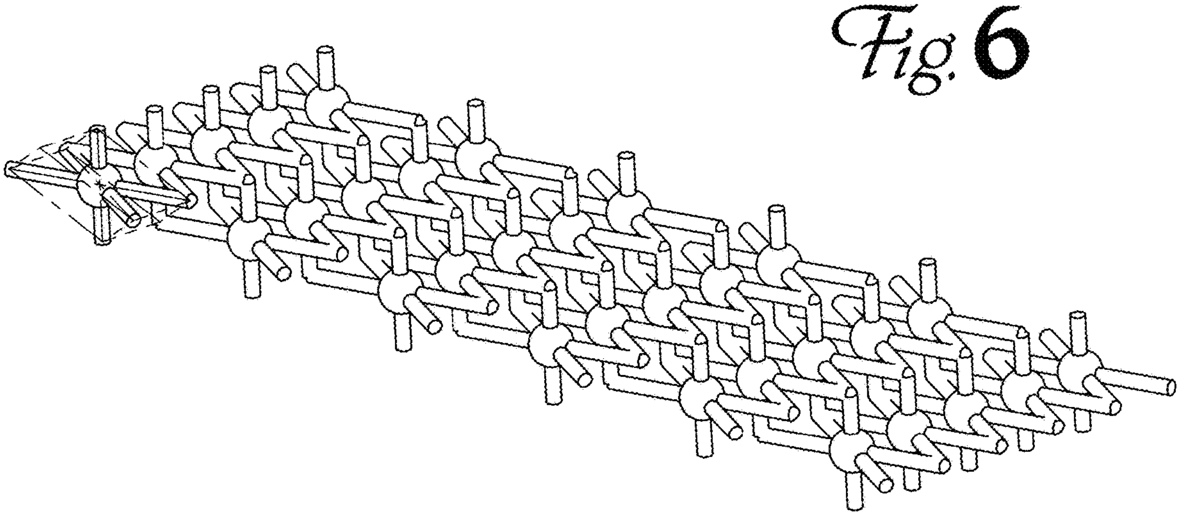
FIG. 6 shows how the trapezoidal-volume object can be arranged to form a flat, repeating periodic structure.
Figure 7:
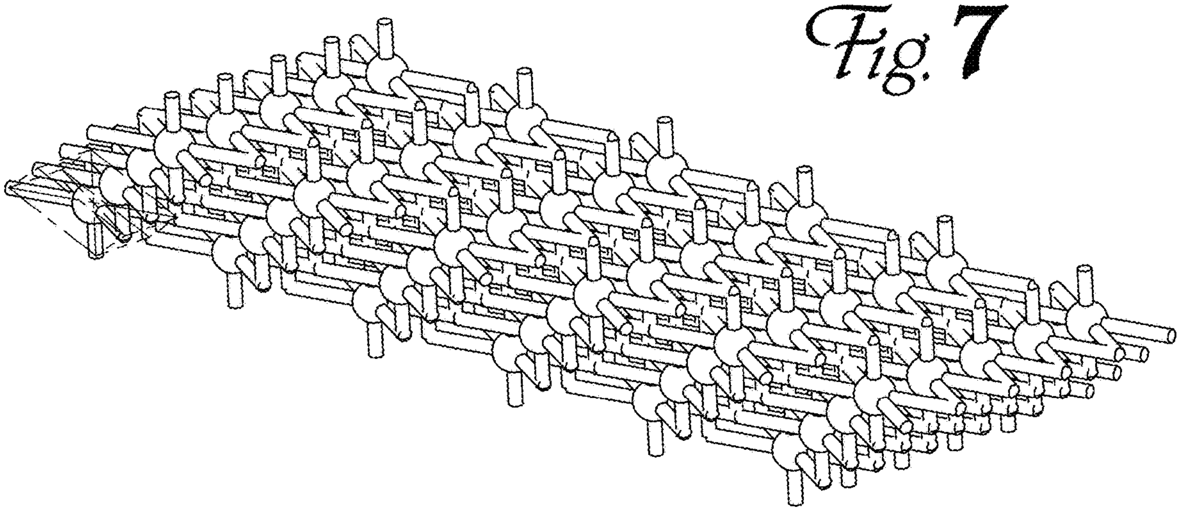
FIG. 7 shows how the trapezoidal-volume object can be arranged by repeating in three non-parallel directions to form another pseudo-crystalline material.

FIG. 5 shows a basic element that may be used in another embodiment of the invention. This basic element is trapezoidal (rather than cubical, as in FIG. 1), so its repeating patterns (e.g., FIG. 6) have different periodicity in different directions. In addition, the directions of repetition are not orthogonal. Instead, they are non-parallel. The three non-parallel directions span a three-space. In this embodiment, the directions are aligned with the edges of the trapezoidal enclosing volume. To construct a material with greater thickness, FIG. 7, copies of the basic element are made in the direction of a third non-parallel edge of the trapezoidal enclosing volume.

Figure 8:
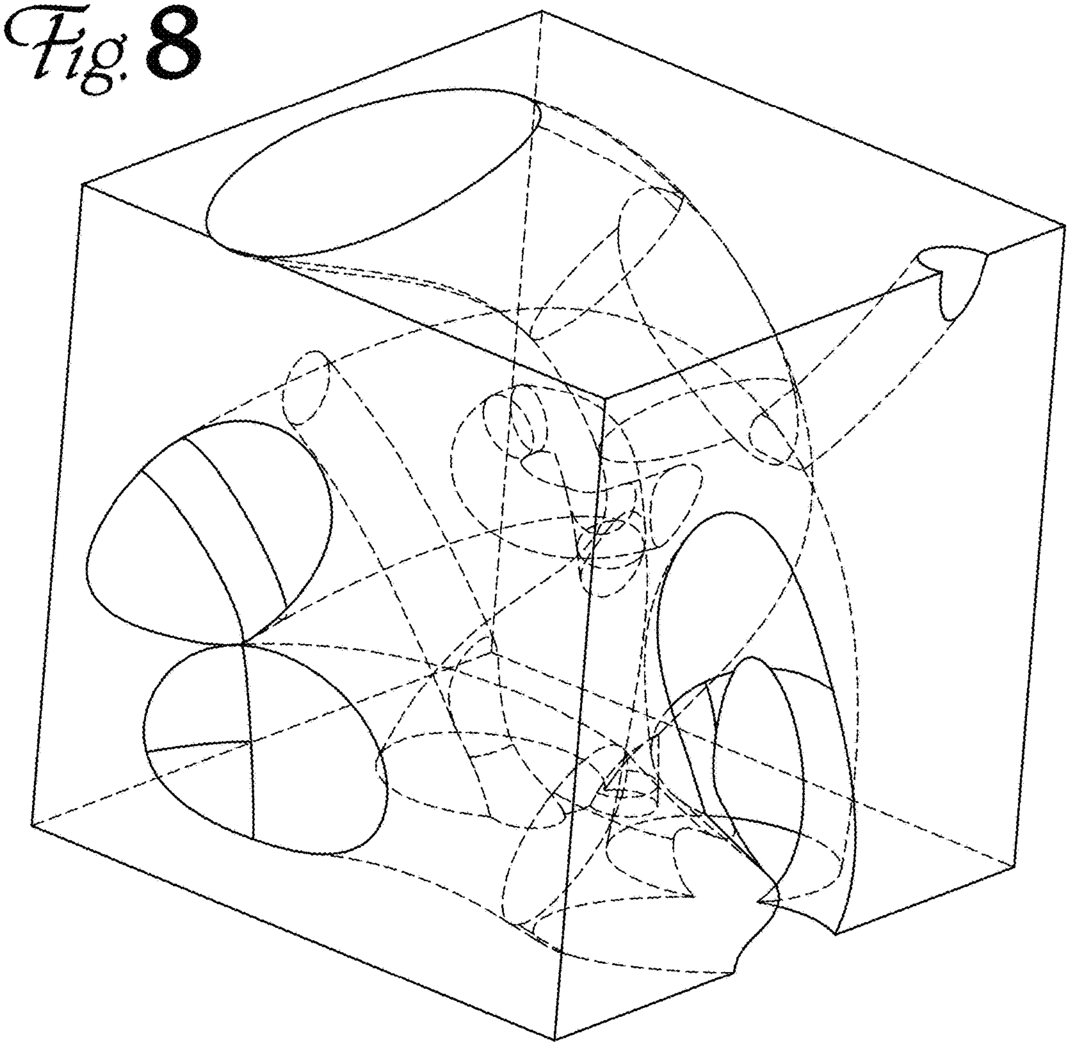
FIG. 8 shows a cubical volume with arbitrary channels of varying sizes passing through it from one face to another.

The basic elements of the foregoing embodiments have been relatively simple, somewhat symmetrical shapes, but an embodiment may use repeating basic elements that are, for example, cubes with multiple channels, possibly of varying diameters, formed from one face to another face, as shown in FIG. 8. If this basic element is repeated in two or three non-parallel directions, a periodic, pseudo-crystalline material is formed. This may satisfy the requirements of an embodiment by being porous—permeable to a gas under pressure—and by passively altering audio-frequency waves propagating through the gaseous medium by different, frequency-dependent amounts. An engineered material comprising cellular units like the one shown in FIG. 8 may lack any straight, clear paths from one point on a surface of a sample and another point on a different surface of the sample (notwithstanding that the sample is porous and permits gas and sound waves to flow therethrough).

The significant and distinguishing physical characteristics of a material according to an embodiment may be stated as follows: an embodiment is a material that comprises open and occupied volumes adjacent each other, where an open or occupied volume at one location within the material corresponds to a plurality of similar open or occupied volumes at other locations in the material, and where the location, orientation and scale of the similar volumes can be specified by a transformational rule. Thus, for example, the material described with reference to FIGS. 1-4 consists of a basic unit comprising seven small rectangular cuboids arranged in a three-dimensional "plus" shape, and for any of the small cuboids, one can identify a plurality of similar small cuboids elsewhere in the material, where the transformational rule is that each similar small cuboid is translated in X, Y and Z dimensions by an integral multiple of the width, length and height (respectively) of the basic unit.

Furthermore, a material according to an embodiment exhibits a nonlinear modification, attenuation or filtering characteristic affecting audio waves passing through a sample of the material, compared to the same audio waves passing through an empty volume bounded by the outer surfaces of the material sample. The modification may be simply described as a low-pass, bandpass, or high-pass filter; although other, more complicated sound-coloring modification profiles can also be designed. From an alternate viewpoint, one can see the material as permitting a different amounts or powers of audio waves to pass through the material. The filtering or modification effect depends on the input frequency and on the structure of the material—which is to say, the size, shape and configuration of each basic unit, the arrangement of basic units in the lattice, and the component ingredients from which occupied volumes in the material are made.

Figure 9:
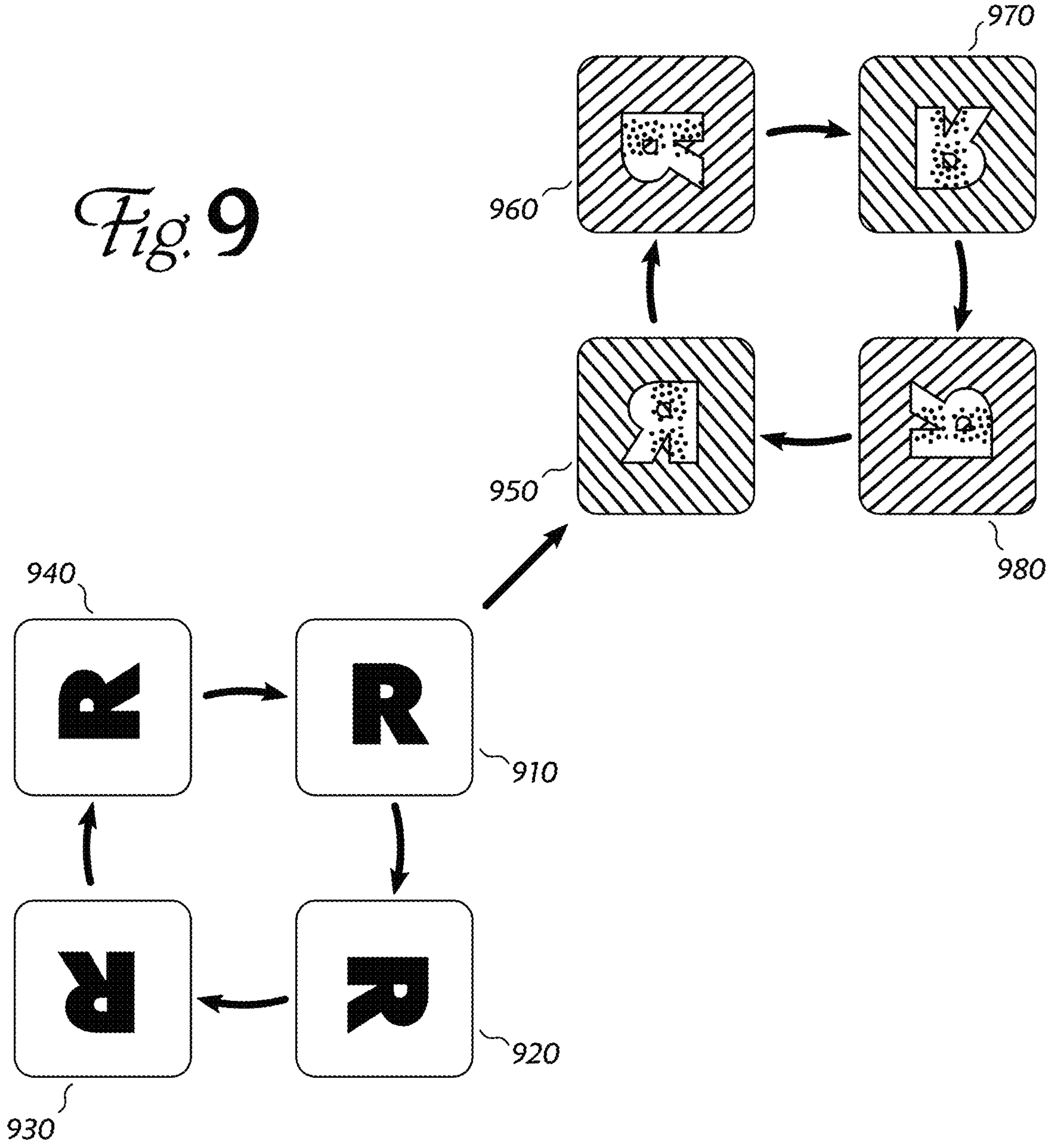
FIG. 9 shows how a simple two-dimensional element can be rotated and/or flipped (mirrored).
Figure 10:
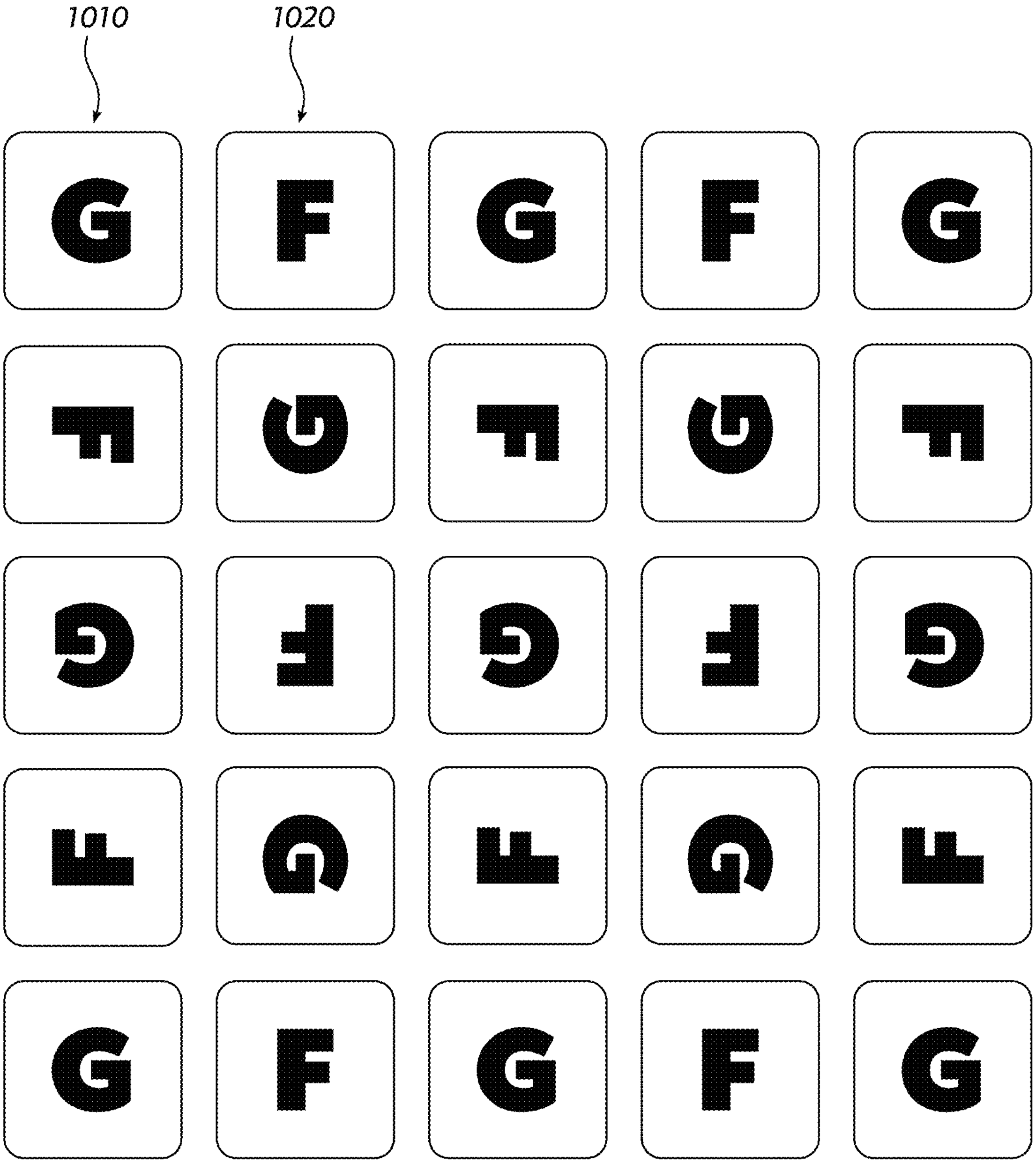
FIG. 10 shows how a two-dimensional array of copies of two different elemental units can be formed with interleaving and rotation.

Although true crystals formed from atoms and molecules typically have only a few possible configurations, pseudo-crystals according to embodiments of the invention have much more flexibility. As shown in FIG. 9, a basic element 910 may, for example, be rotated to a number of different orientations 920, 930, 940, and may be mirrored 950, and rotated in that mirrored configuration (960, 970, 980). Any or all of the transformed basic elements may be combined in a periodic manner to form a material according to an embodiment. For example, FIG. 10 shows two different basic elements 1010 and 1020, which are interleaved in a checkerboard pattern; and each of the basic elements is independently rotated 90° in opposite directions throughout the lattice. Note that FIGS. 9 and 10 show two-dimensional basic elements for clarity; in an embodiment, each basic element is a three-dimensional object, shape or porous volume, which may be rotated and/or mirrored in a regular, repeating manner as it is replicated to form the three-dimensional engineered material.

Figure 11:
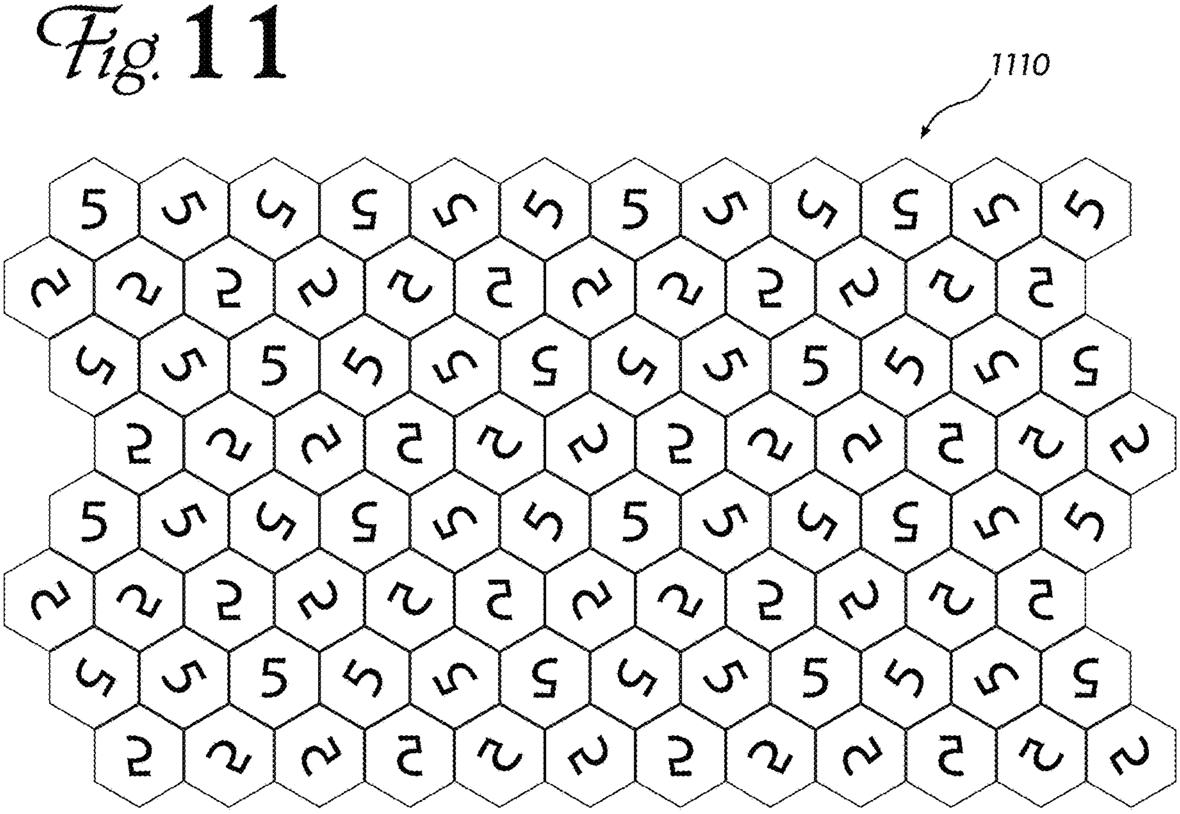
FIG. 11 shows how a two-dimensional array of transformed elemental units can be deformed in bulk.
Figure 11:
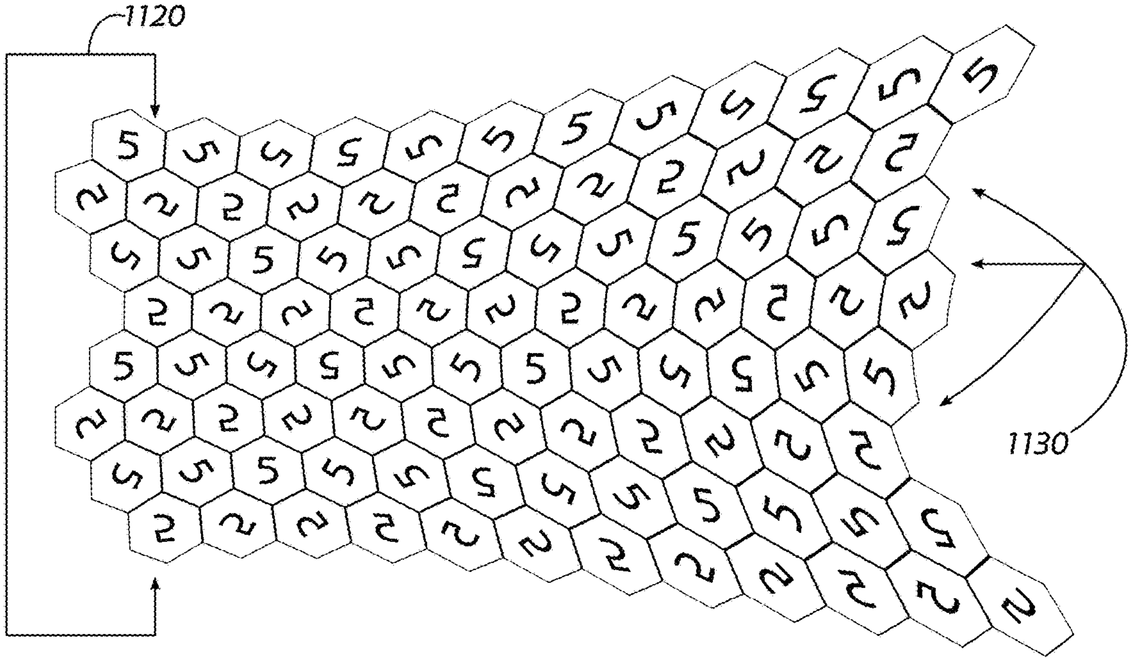

Turning next to FIG. 11, another possible characteristic of an embodiment is depicted. Unlike most true crystals, the size of a basic element in an embodiment may vary somewhat from one location in the lattice to another location in the lattice. Continuing in the simplified two-dimensional depiction style of FIGS. 9 and 10, FIG. 11 shows a hexagonal array of basic cells, 1110, where the cells have been transformed (rotated and/or mirrored) as they are placed in the lattice. After this placement, areas of the lattice may be deformed in bulk: the left side of the lattice may be compressed vertically, 1120; while the right side of the lattice may be compressed to the left, 1130. These bulk deformations alter the periodicity of portions of the material, but not the underlying pattern of repeated elements. In some embodiments, these deformations are smooth (continuously differentiable) through the material, while in other embodiments, the inventive material may comprise adjacent portions that are discontinuously different in periodicity or even in the structure of the basic elements making up the adjacent portions. Deformations like this (when applied to a three-dimensional material according to an embodiment) can be used to tune the frequency response of the embodiment to match a desired response profile. Discontinuous boundaries in the material (rapid changes from an area having one basic unit or repetition pattern, to another area having a different basic unit or repetition pattern) may affect audio waves passing through the material in a manner similar to index-of-refraction changes in an optical material—the audio waves may be reflected or refracted (in a frequency-dependent way) at the boundary.

It is appreciated that hexagons, as shown in this example, area plane-tiling polygon, but they are not a space-filling polygon/polyhedron. The basic elements of embodiments of the invention are typically similar to a space-filling polyhedron such as a tetrahedron or a cube; a distorted version of one of these, such as the trapezoidal polyhedron shown in FIGS. 5-7; or a prism formed from a plane-tiling polygon having a height/thickness that can be stacked for replication in one of the three non-parallel directions. Pairs or larger sets of complementary polyhedra may also be combined to form a pseudo-crystalline material according to an embodiment.

Figure 12:
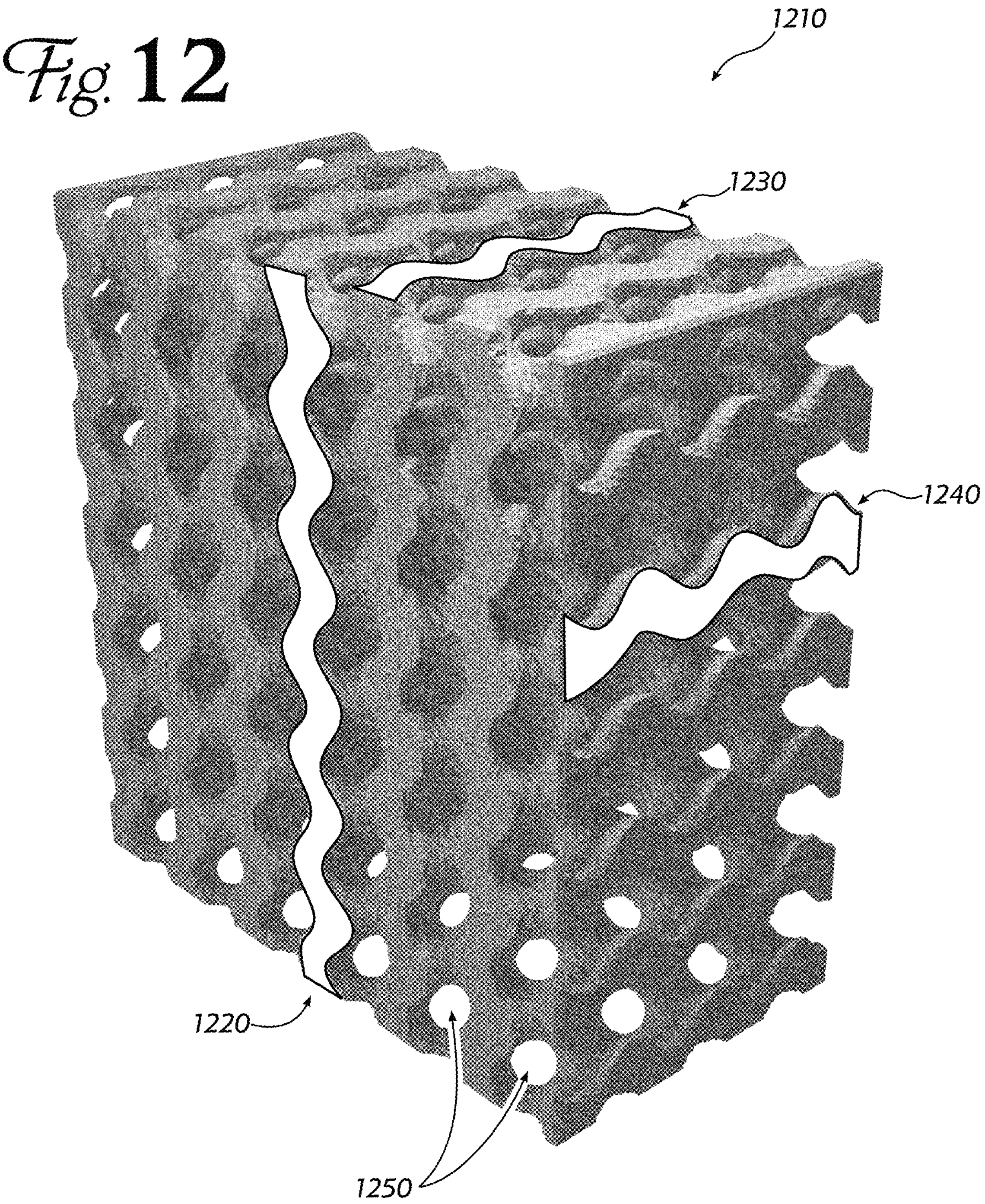
FIG. 12 shows a sample of an engineered pseudo-crystalline material according to an embodiment of the invention.

FIG. 12 shows a rendering of a block of material according to an embodiment of the invention, 1210. Wavy white areas 1220, 1230, 1240 are shown superimposed over the rendering, indicating the periodic characteristics of the material in the three non-parallel directions. At 1250, openings through the material can be seen. These openings permit gas to pass though the material. As discussed at various points above, the material exhibits a passive, frequency-dependent modification of audio waves propagating through the gaseous medium that can pass through the porous material.

Figure 13:
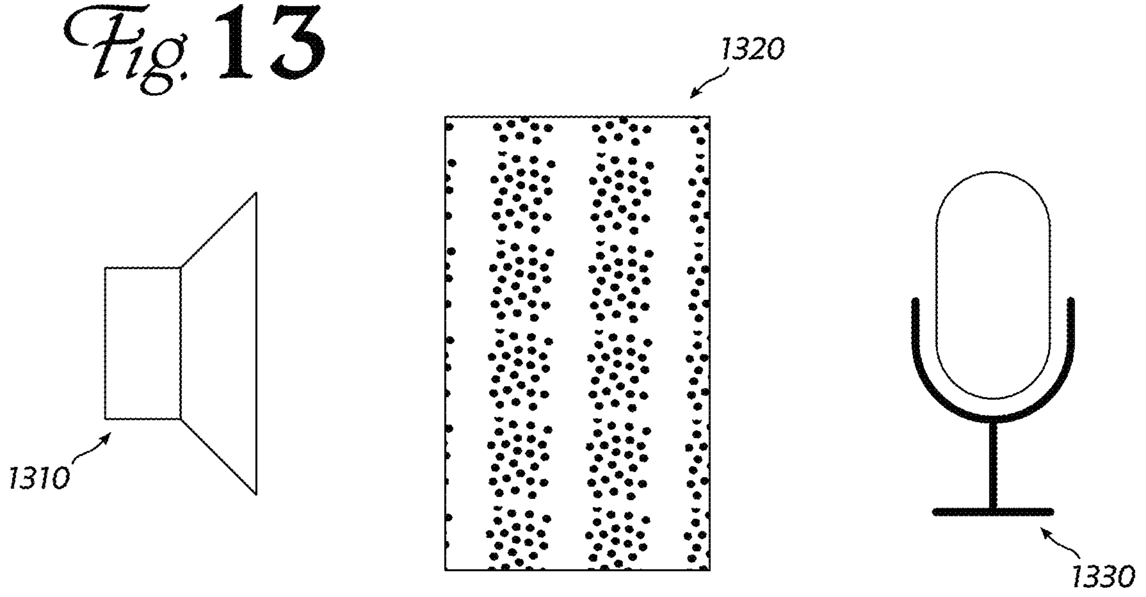
FIG. 13 shows a representative use of the material of an embodiment in an audio system.

FIG. 13 shows a basic arrangement of objects including an embodiment of the invention: an audio source (e.g. a speaker) 1310 emits audio waves, which propagate towards and through a pseudo-crystalline material 1320 according to an embodiment. The audio waves are modified unevenly according to the frequency response of the material; some frequencies may be attenuated more than others, and some frequencies may even pass through the material with less attenuation than in free air (it is theorized that the material may reduce or eliminate destructive interference between different portions of the input audio spectrum). Finally, the unevenly-modified audio signal is received by, for example, a microphone 1330. Note that the modification caused by the pseudo-crystalline material 1320 is passive—the material requires no independent power source to alter the audio signal.

A system such as depicted (in block form) in FIG. 13 can be used to characterize and compare the frequency responses of different material samples under otherwise identical conditions. The material 1320 may be placed in a sealable container having a predetermined interior volume and shape, and the audio input and monitoring output can similarly be coupled to the sample volume so that the audio performance of the pseudo-crystalline material can be isolated, measured and compared. It is understood and appreciated that a sealable container having a predetermined interior volume and shape will have a natural resonant frequency when empty; material samples according to an embodiment may dampen this natural resonance as well as make other frequency-dependent modifications to the input signal.

Figure 14:
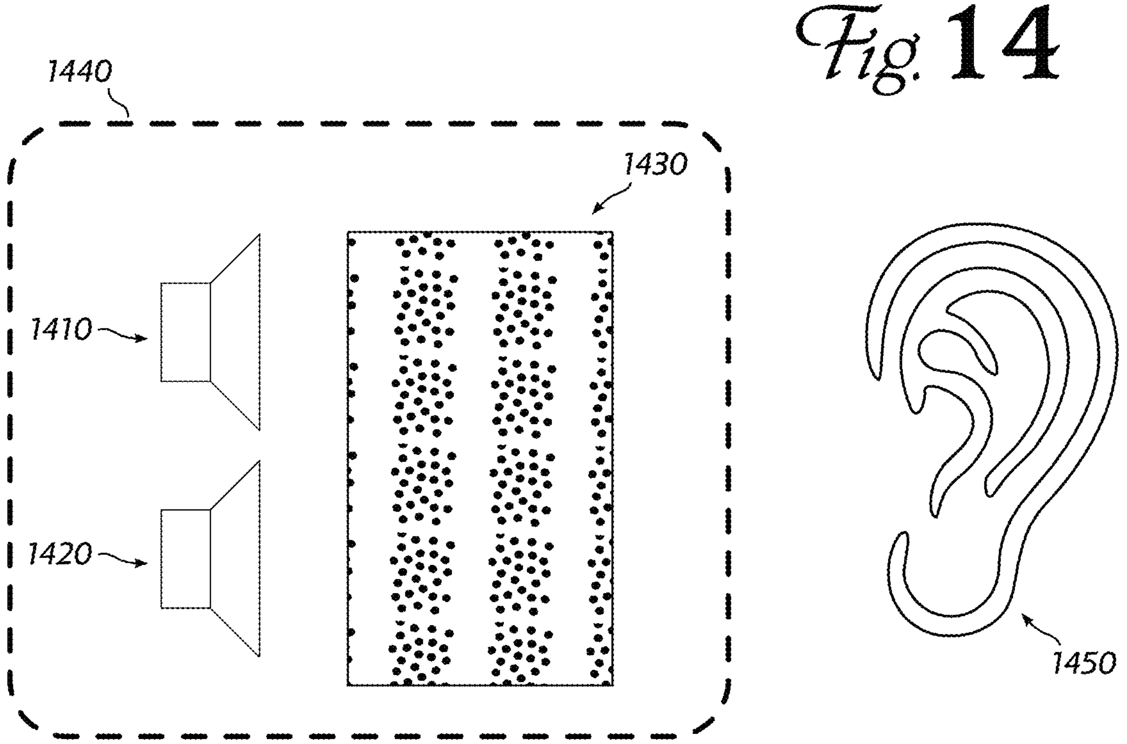
FIG. 14 shows another arrangement of components including the inventive material into an audio system.

FIG. 14 shows another system comprising a passive, pseudo-crystalline material according to an embodiment of the invention. Here, a plurality of audio sources (represented by speakers 1410 and 1420) emit audio waves of various frequencies. These audio waves propagate through a material according to the foregoing description, 1430, and are modified unevenly according to the audio properties of the material. The audio sources 1410, 1420 and audio-modifying material 1430 may be assembled into a monolithic structure, 1440, which may be an over-the-ear headphone or the shell and body of an in-the-ear earphone. In this arrangement, the filtered audio waves propagate to a listener's ear 1450.

It is appreciated that, since a porous, pseudo-crystalline material according to an embodiment may be made of a solid material such as metal or polymer, the material may provide structural support for components assembled with the material (as well as passive, tunable modification of audible signals passing through the material). For example, openings or voids of a predetermined shape may be formed in sample, and devices such as audio transducers or electronic circuitry may be placed in and securely held by those openings.

Applications of the present 3D audio metamaterial will typically fabricate the periodic semi-crystalline base element(s) in a volume through which audio waves to be affected will propagate, but for analysis and comparison purposes, standard-sized and shaped samples will often be used. For example, a cylindrical volume of a predetermined diameter and height, filled with the repeated base element(s), is useful for characterizing the frequency response of a particular element shape, repeated and potentially transformed (by rotation, reflection, or a combination thereof). Similarly, a cuboid volume of predetermined width, height and thickness, may be used to compare the performance of one or more elements, translated, transformed and repeated, at several different scales.

Figure 15:
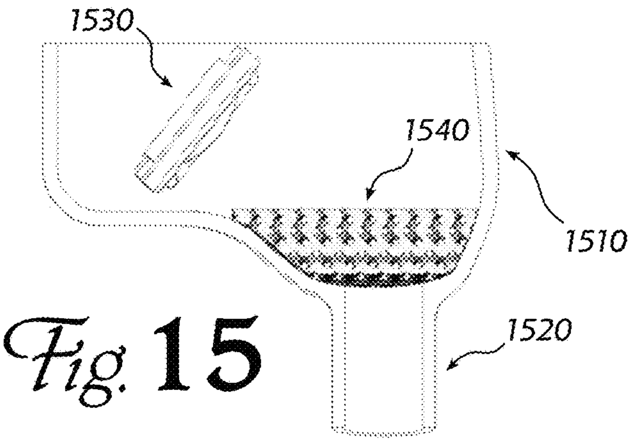
FIGS. 15-20 show a variety of applications of the engineered material in an earphone.

FIG. 15 shows an application of an engineered 3D audio metamaterial according to an embodiment of the invention. In this Figure, a simple, "distorted wineglass" outer shape 1510 (including the glass "stem" 1520) represents a cross section of an in-ear monitor ("IEM") or earphone. The stem 1520 enters the user's ear canal and would be sealed by a foam or custom-formed gasket.

An audio driver 1530 in the body of the IEM emits sound waves into the body, and these are filtered as they pass through the inventive material at 1540 and travel to the user's eardrum.

Figure 16:
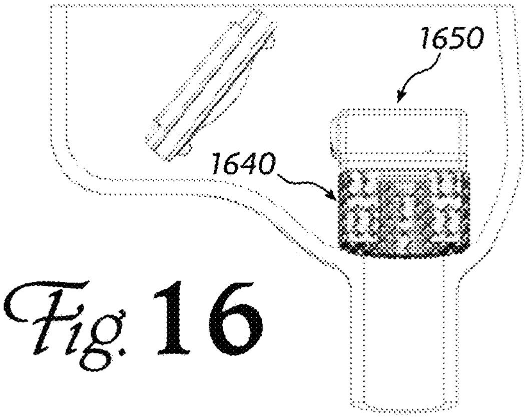

FIG. 16 shows how a block of the inventive material 1640 can be used to support a direct-radiating audio driver 1650. An open tube in block 1640 permits the direct-radiating driver 1650 to emit sound waves directly toward the stem, while the audio modifying characteristics of the block act to filter the sound emitted other drivers within the shell as it travels toward the listener's ear.

Figure 17:
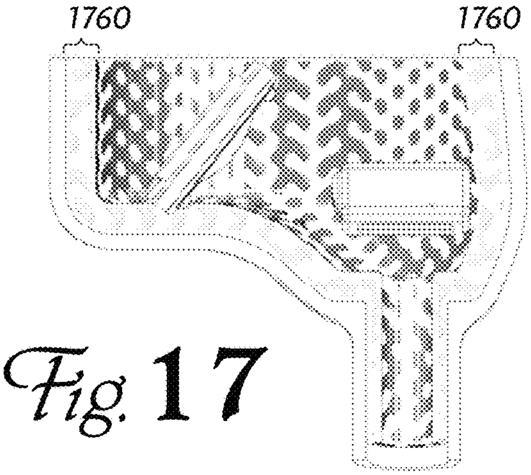

FIG. 17 shows how a layer of the inventive material 1760 may be formed over the inner surface of the IEM, where it may provide tunable dampening to the audio signals propagating therein.

Figure 18:
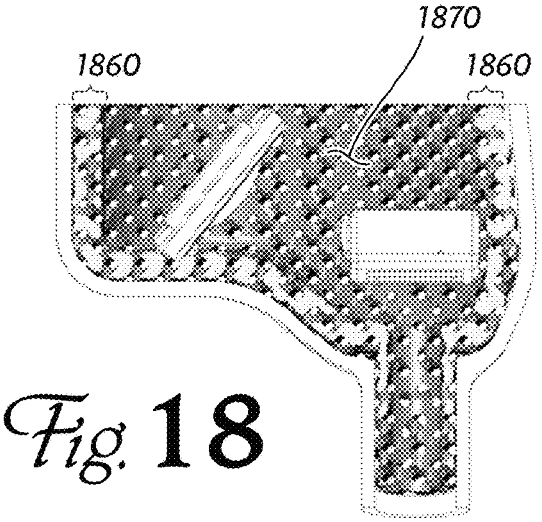

FIG. 18 shows how, in addition to a layer 1860 over the inner surface of the shell, the remaining volume of the shell may also be filled with a pseudo-crystalline material according to an embodiment 1870. The inner coating layer 1860 and the inner volume filler 1870 may use similar basic unit configurations at different scales or with different lattice patterns, or they may use completely different basic units, patterns and sizes. As discussed earlier, the inner volume 1870 may be formed with voids to accept audio drivers or to hold other objects (e.g. electronic circuitry, batteries) comprising the IEM.

Figure 19:
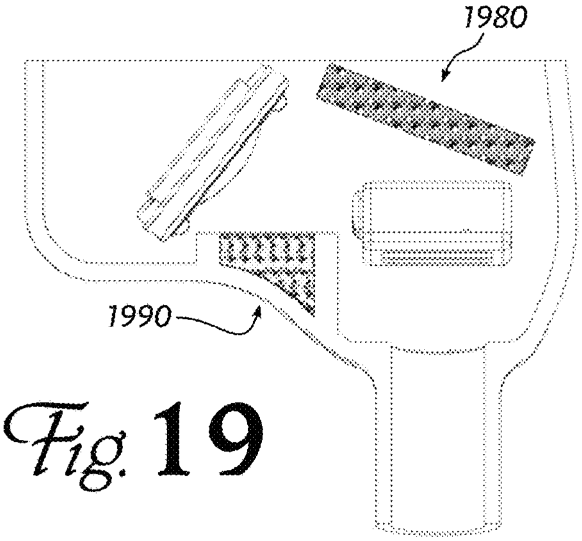

FIG. 19 shows two more applications of 3D audio metamaterials in an IEM: they may be used as baffles 1980 to control audio-wave propagation within the IEM shell, or in a tuned cavity 1990 to alter the acoustics and audio propagation within the shell. The size, shape and configuration of the metamaterial filling the tuned cavity may be adjusted to achieve frequency-response goals, by modifying, dampening or even eliminating resonances, which can improve the overall audio response of the structure. The tuned cavity may be vented to allow certain sound frequencies to escape the shell via the vent.

Figure 20:
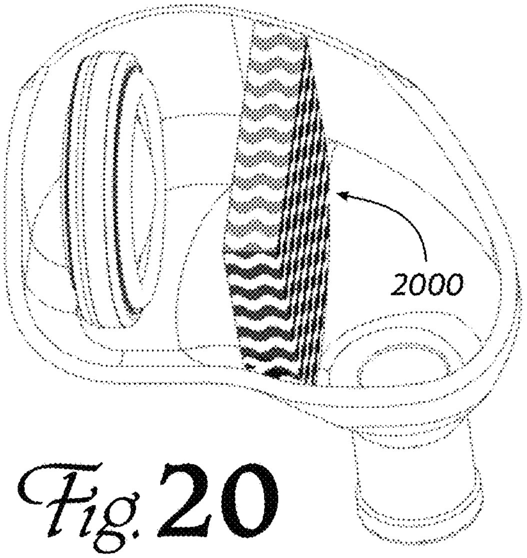

FIG. 20 shows an IEM from a slightly different perspective, where the inventive material 2000 is situated between the audio driver and the stem to provide frequency-dependent, passive modification of the sound traveling to the user's ear.

The applications of the present invention have been described largely by reference to specific examples and physical configurations. However, those of skill in the art will recognize that passive, tunable audio-filtering porous structures can also be designed and manufactured differently than herein described. Such variations and implementations are understood to be captured according to the following claims.

We claim:

1. A three-dimensional (3D) structure comprising:

a plurality of adjacent three-dimensional (3D) objects repeating in three non-parallel dimensions throughout the 3D structure, wherein each 3D object comprises:

a three-dimensional, structurally supporting, element (hereinafter "the 3D structural element") that occupies a portion of one of a plurality of volumes within the 3D structure and abuts another 3D structural element, in another 3D object, that occupies a portion of another one of the plurality of volumes within the 3D structure; and a void that occupies a remaining portion of the one of the plurality of volumes within the 3D structure and at least partially overlaps with another void, in another 3D object, that occupies a remaining portion of another one of the plurality of volumes within the 3D structure;

wherein the voids provide a path through the 3D structure via which a gaseous medium can flow through the 3D structure in at least one direction; and wherein the 3D structure is to passively modify a sound wave as the sound wave propagates through the gaseous medium that flows through the 3D structure, relative to the sound wave as it propagates outside the 3D structure.

2. The 3D structure of claim 1, wherein the plurality of adjacent 3D objects repeating in three non-parallel dimensions throughout the 3D structure, comprises a plurality of adjacent, symmetrically shaped, 3D objects repeating in three non-parallel dimensions throughout the 3D structure.

3. The 3D structure of claim 1, wherein the plurality of adjacent 3D objects repeating in three non-parallel dimensions throughout the 3D structure, comprises a plurality of adjacent, exactly similar, 3D objects repeating in three non-parallel dimensions throughout the 3D structure.

4. The 3D structure of claim 1, wherein the plurality of adjacent 3D objects repeating in three non-parallel dimensions throughout the 3D structure, comprises a plurality of adjacent, similarly oriented, 3D objects repeating in three non-parallel dimensions throughout the 3D structure.

5. The 3D structure of claim 1, wherein the plurality of adjacent 3D objects repeating in three non-parallel dimensions throughout the 3D structure, comprises a plurality of adjacent 3D objects repeating in three mutually orthogonal dimensions throughout the 3D structure.

6. The 3D structure of claim 1, wherein the plurality of adjacent 3D objects repeating in three non-parallel dimensions throughout the 3D structure, comprises the 3D objects repeating in three non-parallel dimensions that are in alignment with each dimension of the 3D structure.

7. The 3D structure of claim 1, wherein the 3D structural element of one 3D object is symmetrical with at least one other 3D structural element in another 3D object within the 3D structure.

8. The 3D structure of claim 1, wherein the 3D structural element that occupies the portion of one of the plurality of volumes within the 3D structure and abuts another 3D structural element, in another 3D object, that occupies the portion of another one of the plurality of volumes within the 3D structure, comprises a 3D structural element that occupies a portion of one of a plurality of cubic, or trapezoidal, volumes within the 3D structure and abuts another 3D structural element, in another 3D object, that occupies a portion of another one of a plurality of cubic, or trapezoidal, volumes within the 3D structure.

9. The 3D structure of claim 1, wherein at least one 3D object comprises a plurality of voids, each of which occupies the remaining portion of the one of the plurality of volumes within the 3D structure and at least partially overlaps with another void, in another 3D object, that occupies a remaining portion of another one of the plurality of volumes within the 3D structure.

10. The 3D structure of claim 9, wherein the plurality of voids each of which occupies the remaining portion of the one of the plurality of volumes within the 3D structure, comprises a plurality of channels formed between a first face and a second face of the one of the plurality of volumes within the 3D structure.

11. The 3D structure of claim 10, wherein the plurality of channels formed between the first face and the second face of the one of the plurality of volumes within the 3D structure, comprises a plurality of channels of varying shapes and diameters formed between the first face and the second face of the one of the plurality of volumes within the 3D structure.

12. The 3D structure of claim 1, wherein a respective location, orientation, and scale is configured for each of the plurality of volumes within the 3D structure.

13. The 3D structure of claim 1, wherein a respective location, orientation, and scale is configured for each of the plurality of volumes within the 3D structure according to a transformational rule in which each 3D object is translated in an x, y and z dimension.

14. The 3D structure of claim 1, wherein a respective location, orientation, and scale is configured for each of the plurality of volumes within the 3D structure according to a transformational rule in which each 3D object is translated in an x, y and z dimension by an integral multiple of width, length and height of the corresponding 3D object.

15. The 3D structure of claim 1, wherein the voids that provide the path through the 3D structure via which the gaseous medium can flow through the 3D structure in at least one direction, comprise voids that are of a sufficient size to provide the path through the 3D structure via which the gaseous medium can flow through the 3D structure in at least one direction when a pressure gradient causes it to do so.

16. The 3D structure of claim 1, wherein the 3D structure that is to passively modify the sound wave as the sound wave propagates through the gaseous medium that flows through the 3D structure, relative to the sound wave as it propagates outside the 3D structure, comprises the 3D structure to non-uniformly modify the sound wave as the sound wave propagates through the gaseous medium that flows through the 3D structure, relative to the sound wave as it propagates outside the 3D structure.

17. The 3D structure of claim 1, wherein the 3D structure that is to passively modify the sound wave as the sound wave propagates through the gaseous medium that flows through the 3D structure, relative to the sound wave as it propagates outside the 3D structure, comprises the 3D structure to passively modify the sound wave in an uneven, frequency-dependent manner.

18. The 3D structure of claim 1, wherein the 3D structure that is to passively modify the sound wave as the sound wave propagates through the gaseous medium that flows through the 3D structure, relative to the sound wave as it propagates outside the 3D structure, comprises the 3D structure to passively modify the sound wave in a frequency-dependent manner based on one or more of: an input frequency of the sound wave; a shape and a size of the 3D structure; a shape and a size of each 3D object; a shape and a size of each 3D structural element; a shape and a size of each void; an arrangement of the plurality of adjacent 3D objects in the 3D structure; and a set of component ingredients that make up the 3D structural elements.

19. An apparatus, comprising:

an audio source that emits sound waves;

a three-dimensional (3D) structure to receive the emitted sound waves from the audio source and passively modify and propagate the modified, emitted sound waves, the 3D structure comprising:

a plurality of adjacent three-dimensional (3D) objects repeating in three non-parallel dimensions throughout the 3D structure, wherein each 3D object comprises:

a three-dimensional, structurally supporting, element (hereinafter "the 3D structural element") that occupies a portion of one of a plurality of volumes within the 3D structure and abuts another 3D structural element, in another 3D object, that occupies a portion of another one of the plurality of volumes within the 3D structure; and a void that occupies a remaining portion of the one of the plurality of volumes within the 3D structure and at least partially overlaps with another void, in another 3D object, that occupies a remaining portion of another one of the plurality of volumes within the 3D structure;

wherein the voids provide a path through the 3D structure via which a gaseous medium can flow through the 3D structure in at least one direction; and wherein the 3D structure is to passively modify the emitted sound waves as they propagate through the gaseous medium that flows through the 3D structure, relative to sound waves that propagate outside the 3D structure.

20. An in-ear monitor (IEM), comprising:

an audio driver that emits sound waves into a body of the IEM;

a three-dimensional (3D) structure in the body of the IEM to receive the emitted sound waves from the audio driver and passively modify and propagate the modified, emitted sound waves to a user's ear canal, the 3D structure comprising:

a plurality of adjacent three-dimensional (3D) objects repeating in three non-parallel dimensions throughout the 3D structure, wherein each 3D object comprises:

a three-dimensional, structurally supporting, element (hereinafter "the 3D structural element") that occupies a portion of one of a plurality of volumes within the 3D structure and abuts another 3D structural element, in another 3D object, that occupies a portion of another one of the plurality of volumes within the 3D structure; and a void that occupies a remaining portion of the one of the plurality of volumes within the 3D structure and at least partially overlaps with another void, in another 3D object, that occupies a remaining portion of another one of the plurality of volumes within the 3D structure;

wherein the voids provide a path through the 3D structure via which a gaseous medium can flow through the 3D structure in at least one direction; and wherein the 3D structure is to passively modify the emitted sound waves as they propagate through the gaseous medium that flows through the 3D structure, relative to sound waves that propagate outside the 3D structure.

* * * * *